No. 788,906. PATENTED MAY 2, 1905.
W. HOMANN.
EXCAVATING BUR FOR DENTISTS.
APPLICATION FILED OCT. 15, 1903.
Fig:1.
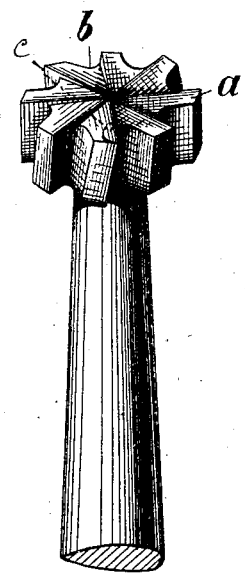
Fig:2.
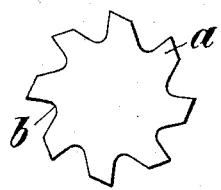
Witnesses: Inventor:

No. 788,906. Patented May 2, 1905.

UNITED STATES PATENT OFFICE.

WILLY HOMANN, OF DÜSSELDORF, GERMANY.

EXCAVATING-BUR FOR DENTISTS.

SPECIFICATION forming part of Letters Patent No. 788,906, dated May 2, 1905.

Application filed October 15, 1903. Serial No. 177,126.

*To all whom it may concern:*

Be it known that I, WILLY HOMANN, a citizen of the German Empire, and a resident of Düsseldorf, Germany, have invented certain new and useful Improvements in Excavating-Burs for Dentists, of which the following is a specification.

In excavating-burs ordinarily used in dental operations there are acute-angled prominences, and it occurs not unfrequently that the cutting edges or points of the said prominences, or even the latter themselves, break. To avoid this, a comparatively small degree of hardness is imparted to these edges in the manufacture of the instrument, an early wearing out and getting dull being the consequence.

My invention refers to an improvement in dental burs which is described herein and illustrated by the accompanying drawings and adapted to avoid the aforementioned difficulty, offering at the same time various other advantages hereinafter mentioned.

In the accompanying drawings, Figure 1 is a perspective view of a dental drill embodying my invention, and Fig. 2 is a section through the drill-head.

As can be readily seen from the drawings herewith, the dental bur is provided with teeth which are backed off to produce the oblique facets $a$. The front or cutting edge of each tooth thus forms an acute angle, while its back forms an obtuse angle. Between the teeth the furrows are made in the shape of concave recesses $b$. The face of the bur is provided with a series of radial cutting edges $c$, extending from the center of the bur to the cutting edges of the several teeth. The radial cutting edges on the face of the bur serve to deepen the cavity in the tooth, while the backed-off teeth serve to widen such cavity. The larger volume of the prominences near the cutting edge and the obtuse angle allow the imparting of a higher degree of hardness, so that they will stand more and wear out not so quickly as was hitherto the case. The obtuse angle has the further advantage that the form of the edges will not change by regrinding. Another convenience is that the concave furrows prevent the chippings from sticking within the same and make them drop directly and be no more an obstruction to the operation of the tool. The concave furrows permit, further, an easy cleaning of the instrument.

Having now described my invention, what I claim is—

A dental bur having teeth with oblique facets to form acute cutting edges and obtuse backs, concave furrows between the teeth, and radial cutting edges on the face of the bur that extend from its center to the cutting edges of the teeth, substantially as specified.

Signed by me at Düsseldorf, Germany, this 29th day of September, 1903.

WILLY HOMANN.

Witnesses:
WILLIAM ESSENWEIN,
RUDOLPH LIEBER.